United States Patent [19]

Edler

[11] 4,244,846
[45] Jan. 13, 1981

[54] SULFITE WASTE LIQUOR-UREA FORMALDEHYDE RESIN PLYWOOD GLUE

[76] Inventor: Folke J. Edler, Sandviken 13460, 44405 Ödsmäl, Sweden

[21] Appl. No.: 86,805

[22] Filed: Oct. 22, 1979

Related U.S. Application Data

[63] Continuation-in-part of Ser. No. 899,237, Apr. 24, 1978, Pat. No. 4,194,997, which is a continuation-in-part of Ser. No. 738,370, Nov. 3, 1976, abandoned, which is a continuation of Ser. No. 574,515, May 5, 1975, abandoned.

[51] Int. Cl.³ .............................................. C08L 61/24
[52] U.S. Cl. ............................ 260/17.3; 106/123 R; 106/213; 106/214; 156/328; 156/331; 260/17.5; 260/29.4 R; 260/39 R; 428/528
[58] Field of Search .............. 260/29.4 R, 17.5, 17.3, 260/39 R; 106/123 R, 213, 214; 264/109; 156/328, 331; 428/528

[56] References Cited

U.S. PATENT DOCUMENTS

| | | | |
|---|---|---|---|
| 2,405,650 | 8/1946 | Hartwig et al. | 260/17.5 |
| 2,622,979 | 12/1952 | Keim | 260/17.5 |
| 3,313,745 | 4/1967 | Klug | 260/17.5 |
| 3,395,033 | 7/1968 | Remer | 106/124 |
| 3,990,928 | 11/1976 | Schmidt-Hellerau | 260/17.5 |
| 3,994,850 | 11/1976 | Willegger et al. | 260/17.5 |
| 4,070,314 | 1/1978 | Alexander et al. | 260/17.3 |

*Primary Examiner*—Lorenzo B. Hayes
*Attorney, Agent, or Firm*—Eugene D. Farley

[57] ABSTRACT

A plywood glue comprises an aqueous mixture of from 30-90 parts by weight urea formaldehyde resin, from 10-70 parts waste liquor from the acid sulfite pulping of lignocellulose, an amylaceous filler and from 0-2 to 4.0% ammonium ion (expressed as $NH_3$), based on the waste liquor solids. Prior to mixing, the sulfite waste liquor component of the mixture has a pH of from 3-9; the urea formaldehyde resin, a pH of from 6-9. The urea formaldehyde resin is further characterized by a molar ratio of formaldehyde to urea of from 1.2 to 2.5 and a methylol content corresponding to a Witte number of from 1.0 to 2.2.

Plywood is made using the herein described glue by applying to the surfaces of wood veneers a bonding quantity of the glue, assembling the adhesive-coated veneers, and pressing the resulting assembly to cure the glue and bond the veneers together.

11 Claims, 2 Drawing Figures

EFFECT OF FILLER TYPE ON THE DRY SHEAR WOOD FAILURE OF UREA FORMALDEHYDE RESIN PLYWOOD GLUE CONTAINING 30 % SPENT SULFITE LIQUOR SOLIDS AS A REPLACEMENT FOR UREA FORMALDEHYDE RESIN SOLIDS

SULFITE WASTE LIQUOR-UREA FORMALDEHYDE RESIN PLYWOOD GLUE

BACKGROUND AND SUMMARY OF THE INVENTION

This application is a continuation-in-part of the patent application of Folke J. Edler Ser. No. 899,237, filed Apr. 24, 1978; now U.S. Pat. No. 4,194,997 the same being a continuation-in-part of the abandoned patent application of Folke J. Edler, Ser. No. 738,370, filed Nov. 3, 1976; the same being a continuation of abandoned patent application Ser. No. 574,515, filed May 5, 1975.

The present invention relates to plywood glues including urea-based condensation products of formaldehyde and sulfite waste liquor.

Others heretofore have investigated the possibility of combining various synthetic resins, including urea formaldehyde resins, or the components thereof, with various sulfite waste liquors. Among these are Hartwig et al., U.S. Pat. Nos. 2,405,650 (cores for metal castings), Keim 2,622,979 (wet strength paper), and Walther et al., 3,313,745 (foamed bodies).

Schmidt-Hellerau U.S. Pat. No. 3,390,920 discloses the use of urea formaldehyde resin and a very minor proportion (1–5%) of sodium ligninsulfonate in wood particle board production. Willegger et al. U.S. Pat. No. 3,994,850 discloses the manufacture of wood particle board using an adhesive prepared by reacting together urea, sodium base spent sulfite liquor and formaldehyde.

However, none of the procedures of the foregoing references have solved successfully the problem of incorporating a large proportion of sulfite waste liquor in plywood glues. It has become axiomatic in the industry that the use of substantial quantities of these materials in the manufacture of such glues is to be avoided for reasons of incompatibility with the resin constituents of the glues and unacceptable properties of the plywood manufactured using the glues.

This belief is based on the results of extensive experimental experiences and is fully justified by the molecular complexity of the two reactants, i.e. the sulfite waste liquor and the urea formaldehyde resin, as well as by the diversity of chemical reactions which potentially can occur during the preparation of the resin, the mixing of the resin with the sulfite waste liquor, and the subsequent hot pressing operation.

Thus, the sulfite waste liquors are imcompatible with and insoluble in, certain of the urea resins.

Under certain conditions and formaldehyde combine to form resinous condensation products containing a high proportion of mono-di and poly-methylol ureas, i.e. "methylol rich" products. Under othe conditions the urea and formaldehyde combine to form a high proportion of methylene ureas, i.e. "methylene rich" products. The methylol rich products are compatible with sulfite waste liquors, whereas the methylene rich products are not.

Accordingly, if the urea formaldehyde resin is to be combined successfully with sulfite waste liquor, it must be of the methylol rich type.

Second, when the urea formaldehyde resin is mixed with substantial quantities of an untreated ammonium base sulfite waste liquid which contains ammonia in the form of ammonium lignin sulfonate, the ammonia quickly removes any free and loosely bound formaldehyde present in, or supplied by, the urea formaldehyde resin, converting it to the relatively inactive product hexamethylene tetramine. This reaction liberates excess lignin sulfonic acids which lower the pH of the glue mixture, over-catalyze the glue and result in excessively rapid cure and premature gelation. Conversely, when the resin is mixed with calcium, magnesium or sodium base sulfite-waste liquor, no ammonia at all is present, the above noted liberation of lignin sulfonic acids does not occur and the glue will be under-catalyzed.

Accordingly, it is important that the ammonia content of the glue be carefully controlled.

Third, variations in the pH of both the glue and its components can affect materially the activity and properties of the glue. Too high a pH causes the glue to cure too slowly. Too low a pH causes it to cure too fast. Still further, in the hot press excess acidity may degrade the cellulose content of the wood to which it is applied.

For these reasons it is necessary to control carefully the pH of both the sulfite waste liquor and urea formaldehyde resin components of the glue.

My co-pending patent application Ser. No. 899,237, of which this application is a continuation-in-part, discloses and claims adhesives comprising urea formaldehyde resins and sulfite waste liquors in major proportion useful in the gluing of wood products, and in particular in the manufacture of wood particle board. I now have discovered, however, that the gluing together of wood veneers in the manufacture of plywood using adhesives of this general class presents unique problems requiring the special consideration and the observance of unique critical limits in the formulation of the urea formaldehyde resin-sulfite waste liquid adhesives with which the veneers are bonded.

Urea-formaldehyde resins intended for use as plywood glues have much higher formaldehyde-urea ratios than those used as particle board adhesives. Their formaldehyde-urea mol ratio is seldom less than 1.6 to 1 and frequently is as high as 2 to 1.

One of the main reasons for such high formaldehyde-urea ratios is that hot press temperatures for plywood are much lower than those for particle board (typically 260° F. compared to 320° F.) those to minimize the formation of steam blisters. As a result, the rate of temperature increase in the center of a plywood panel of any given thickness is significantly slower than at the center of its particle board equivalent. Accordingly, to maintain commercially satisfactory press times, greater use is made of chemical acceleration of cure. This includes (1) higher concentration of formaldehyde as a reaction driving force and (2) stronger acidity to catalyze a faster curing reaction.

As a result, the mixed adhesive working life is shorter, but is accomodated to gain the faster press times. The lower temperature limit for a legitimate urea-formaldehyde resin cure accelerated in this manner is near 0° C. However, the curing time cycle is many hours instead of several minutes. Variations of this chemically accelerated curing method are used to product "room temperature-hardening" urea-formaldehyde resin adhesives for cold press applications. Such cold press adhesive applications are substantially unknown in the particle board art.

Other critically important factors distinguishing the application of adhesives in the manufacture of plywood from their application in the manufacture of particle board are as follows:

Per unit volume of wood, only about one-third as much adhesive is used in the manufacture of plywood as is used in the manufacture of particle board. This is a direct consequence of the tremendously increased surface area presented by the wood particle components of particle board, as compared with the wood veneer components of plywood.

To accommodate this greatly increased surface area without introducing too much water, particle board adhesives are used in concentrated form but are applied as very thin films. Thus, although the rate of application is low, typically one-half to two pounds per thousand square feet of chip surface area, the total quantity of adhesive solids applied per unit volume of product is necessarily large—several times that required for plywood.

The exact moisture content of wood veneers used in the manufacture of plywood is not critical to the handling and performance of plywood glues except than an excess causes steam blisters and ruptured bonds in the hot press. Veneer moisture contents above about 6% are considered excessive for this reason. By contrast, the wood particles used in the manufacture of particle board must contain a higher but controlled amount of moisture as they enter the hot press because this moisture is needed as steam to plasticize the wood chips for adequate consolidation and to transport heat more rapidly from surfaces to core. Thus, the moisture content of veneers to be used in the manufacture of plywood is from 0–6%, from that of wood particles to be used in the manufacture of particle board is from 8–10.5% (definitely no lower).

To be suitable for the manufacture of plywood, the plywood glue must have a content of a critical filler. No filler is needed in a particle board adhesive. In fact, its presence causes undesirable clogging of spray nozzles and orifices in application equipment. A plywood glue will tolerate a higher proportion of sulfite waste liquor than will a particle board adhesive, while still retaining its usefulness in the manufacture of a commercially acceptable glued product. More specifically, I have found that a plywood glue of the class under consideration will tolerate as much as 70% by weight sulfite waste liquor, whereas the upper sulfite waste liquor limit for a particle board adhesive is but 50%, dry solids basis.

The urea formaldehyde resins conventionally used in the manufacture of glues to be applied in plywood manufacture are advanced to a significantly greater degree than are those to be used in the manufacture of particle board adhesives. As a result their viscosities are significantly higher.

A plywood glue must have qualities accommodating it to cold press techniques. A particle board adhesive need not have such characteristics.

It accordingly is the general object of the present invention to provide a glue specifically tailored for use in the manufacture of plywood, which glue includes a large proportion of the spent liquor resulting from the sulfite pulping of lignocellulose; is easily and simply manufactured; is readily applicable to the manufacture of plywood using conventional apparatus and methods; which may be used in the production of substantially all grades of interior plywood of commercially acceptable properties; which meet the commercial standards for such products, and are fully competitive with related products manufactured using conventional, more expensive adhesives.

Another important object of the invention is the provision of a method for making such plywood glues.

Still another object of the invention is the provision of a novel plywood product manufactured with the herein described glues and a method of making such a product.

Yet another significant object of the invention is the provision of a plywood glue the manufacture of which utilizes in very large proportion a very low cost waste product, sulfite waste liquor, and thereby at the same time assists in the classic problem attending the disposition of pulp mill sulfite waste liquor while providing important economies in the cost of a plywood glue.

I now have discovered that the problems attending the combination of urea formaldehyde resins and waste sulfite liquors in the manufacture of a useful plywood glue may be overcome, and the special requirements of a plywood glue fully met, by the provision of a glue broadly comprising 30–90 parts by weight of urea formaldehyde resin solids and from 10–70 parts by weight of the spent liquor resulting from the acid sulfite pulping of lignocellulose, dry solids basis.

The glue also contains as a key component from 0.2 to 4.0% by weight of ammonium ion (expressed as $NH_3$) on a sulfite spent liquor solids basis. The ammonium ion may be supplied by the utilization of ammonia base sulfite spent liquor of adjusted ammonium ion content. In the event that it is desired to use another sulfite spent liquor, i.e. a calcium base, magnesium base, or sodium base sulfite spent liquor, the ammonium ion may be provided by the addition of a water soluble, ammonium salt of a strong acid in appropriate amount.

The ammonium salt has the effect of providing ammonia which combines with the free formaldehyde present in the mixture to form the neutral product hexamethylene tetramine, releasing a strong acid, and leaving a mixture of increased but controlled acidity which promotes the desired condensation or polymerization of the adhesive product during its use, as set forth hereinabove.

The glue further contains a filler comprising an amylaceous flour used in the amount of from 30–300 parts by weight of the total dry weight of the urea formaldehyde resin and spent liquor solids.

The urea formaldehyde resin component of the glue is characterized by a molar ratio of formaldehyde to urea of from 1.2 to 2.5, and a high methylol content corresponding to a Witte number of from 1.0 to 2.2. The properties of the resin thus are such as to insure compatibility with, and a desired degree of solubility in, the sulfite spent liquor as required to provide a suitable plywood glue.

the plywood glue product is manufactured by simply mixing together the sulfite spent liquor and the urea formaldehyde resin in the presence of ammonium ion and amylaceous filler under conditions of temperature, pH and viscosity which lead to the production of a mixture in which the lignin sulfonic acid component of the sulfite spent liquor and the urea formaldehyde resin do not condense rapidly with each other to a substantial degree. The product thus is to be distinguished from the prior art products wherein such rapid condensation occurs, or is deliberately promoted. It also is to be distinguished from the prior art processes wherein the sulfite waste liquor is reacted with urea and formaldehyde in a ternary mixture of these components.

In the application of the glue of the invention to the manufacture of plywood, the glue is simply applied to wood veneers in appropriate amounts and proportions and pressed, using conventional apparatus, to form the final plywood product.

DESCRIPTION OF PREFERRED EMBODIMENTS OF THE INVENTION

|  | General | Preferred |
|---|---|---|
| Urea formaldehyde resin | 30–90 | 50–75 |
| Spent liquor from the acid sulfite pulping of lignocellulose | 10–70 | 25–50 |
| Filler comprising cereal flour | 30–300 parts by weight per 100 parts of the combined weight of resin and spent liquor solids | |

The presently described plywood glues broadly comprise in substantially uncondensed admixture with each other, in parts by weight on a dry solids basis:

The glues further contain from 0.2 to 4.0% by weight of ammonium ion (expressed as NH$_3$), on a spent liquor solids basis.

As noted above, the urea formaldehyde resin is characterized by carefully controlled properties determining the use of the finished glue in plywood manufacture. Pre-eminent among these properties are its mol ratio of formaldehyde to urea of from 1.2 to 2.5, by which is meant from 1.2 to 2.5 mols of formaldehyde per mol of urea; by its pH of from 6 to 9; and by its methylol content corresponding to a Witte number of from 1.0 to 2.2. Additionally, it should have a solids content of from 45 to 75% and a viscosity of, for example, 400 to 1200 centipoises at 65% solids and 25° C.

With respect to the mol ratio of the resin, it is to be observed that if the mol ratio is below 1.2, the urea formaldehyde polymers are not sufficiently functional in plywood glues to develop the desired adhesive qualities in the final product. However, at a ratio of above 2.2, excessive quantities of formaldehyde are present. This leads to hyper reactivity of the glues and also to the formation of glues which liberate excessive toxic fumes in the hot press and thereafter in service.

However, as fully discussed above, plywood glues of the class under consideration can tolerate a much higher concentration of formaldehyde than can particle board adhesives because of the reduced amount of glue required and because of the shielding effect of the surface veneers, which act to some degree as an odor screen.

With respect to the methylol content of the urea formaldehyde resin, a methylol content corresponding to a Witte number of from 1.0 to 2.2 is required in order to make the urea formaldehyde resin compatible with the sulfite spent liquor and in order to develop satisfactory adhesion and product performance.

The Witte number is obtained as a result of a determination of the methylol groups in urea formaldehyde resins by reacting the resins with 2,5-dimethyl phenol (2,6-xylenol). It measures the methylol functionally of the resin. It is determined as follows:

A solution of 2,6-dimethyl phenol (25.0 g) in 200 ml. of water containing 8.0 g sodium hydroxide is treated with 12.5 g of the urea formaldehyde resin to be treated, with thorough mixing. The resulting reaction mixture is allowed to stand at room temperature in the dark for three days. Concentrated hydrochloric acid is added until the pH of the reaction mixture reaches 5.5–6.0. The reaction mixture is washed into a one liter flask and steam distilled until 700–750 m. of distillate has been collected.

The condenser is rinsed with a little methylene chloride and the condensate extracted with 3×100 ml. of methylene chloride. The combined methylene chloride extracts are filtered through ca. 20 g sodium sulfate (anhydrous) and the sodium sulfate washed with 2×25 ml. methylene chloride.

The methylene chloride is evaporated in vacuo until constant weight of the evaporating flask is obtained. The weight of the residual 2,6-dimethyl phenol is determined and subtracted from its original weight. The difference of these two weights is the amount of 2,6-dimethyl phenol which has reacted with the urea formaldehyde resin and is a measure of the methylol content of the resin. It is termed herein the "Witte number". This value is calculated by the following equation:

$$\frac{\text{Weight of Reacted Xylenol}}{12.5 \times \%\text{Solids of } UF \text{ Resin}} = \text{Witte Number}$$

It bears a direct relationship to the methylol content of the resin, as shown by the following tabulation of typical test results in which the Witte numbers were determined for a series of urea formaldehyde resins of varying mol ratios (mols formaldehyde per mol of urea) prepared in such a manner that methylol functionality was maximized for use in plywood glues.

| Formaldehyde Mol Ratio | Witte No. |
|---|---|
| 1.10 | 1.02 |
| 1.20 | 1.07 |
| 1.35 | 1.14 |
| 1.90 | 1.43 |

It will be noted that the Witte number of the urea formaldehyde plywood resins described herein (a maximum of 2.2) can be substantially higher than the Witte number of the urea formaldehyde particle board resins specifically exemplified in my copending application Ser. No. 899,237 (a maximum of 1.8). This is for the reason that the mol ratio of the urea formaldehyde plywood resins is generally higher than the mol ratio of the urea formaldehyde particle board resins.

The presently described plywood glues require in their formulation a urea formaldehyde resin component having a pH of from 6 to 9. Plywood urea formaldehyde resins are almost invariably higher in viscosity (more advanced) than particle board resins at the same solids level. To insure adequate storage life, their initial pH is sometimes adjusted to a value above 8.

The viscosities characterizing the components of the herein described adhesive mixture and of the final mixture are subject to considerable variation depending upon operating conditions and other factors. However, as indicated above, a suitable viscosity range for the urea formaldehyde resin component is from 400 to 1200 centipoises at 65% solids and 25° C. This value is determined by the consideration that the viscosity of urea formaldehyde resins intended for use in plywood glues in considerably higher on the average than in the case of such resins intended for use in the manufacture of particle board. Their greater advancement for faster inherent cure is one reason. The other is prepress tack. Urea adhesives hold water so effectively that the prepress bond veneers in plywood develops very slowly under cold pressure. Therefore, plywood urea formaldehyde resins are advanced in viscosity to provide all possible prepress tack that can be gained without causing application problems.

Dilution lowers viscosity rapidly. For example, a resin of 1,000 centipoises at 65% solids and 25° C. would measure perhaps 100 centipoises at 53% solids and 25° C. Temperature changes produces a similar large effect, other conditions being held constant.

As noted, the solids content of the urea formaldehyde resin preferbly lies within the range of 45 to 75%, dry solids weight basis. The lower limit of 45% is set on the basis of water solubility. Even when advanced only to a relatively low viscosity, for example 100 centipoises, a urea resin at 48% solids is near its limit of water tolerance and tends to precipitate to a gummy residue on addition of water during glue formulation and equipment cleanup. At an upper resin solids limit of 75%, the resin advancement is so low that resin performance properties such as tack and assembly time tolerance become adversely affected. However, under appropriate conditions, spray dried urea formaldehyde resins at 100% solids are operable in the adhesives of my invention.

Turning now to a consideration of the sulfite waster liquor component of the plywood adhesive of the invention.

By the term "sulfite waste liquor" is meant the liquor resulting from the conventional acid sulfite pulping procedure in which there is about 5 to 7% by weight total sulfur dioxide and 0.9 to 1.2% combined sulfur dioxide.

The sulfite waste liquor results from any of the conventional acid sulfite lignocellulose pulping procedures. It accordingly may comprise any of the commonly produced acid sulfite waste liquors, whether ammonium base, calcium base, magnesium base or sodium base.

Specifically excluded, however, are the sulfite waste liquors resulting from the pulping of lignocellulose by the "Magnafite", "Sodafite" and neutral sulfite semichemical ("NSSC") processes. These three waste liquors are inoperable for the purposes of the invention and are excluded by definition from the description thereof because all of them contain substantial quantities of residual sulfite ion in their concentrated liquors. As is explained in greater detail hereinbelow, this would result in an unfavorable adhesive pH change if these liquors were to be applied to the formulation of the herein described adhesives.

The sulfite waste liquors may be employed substantially in the form in which they are obtained from the liquor concentrating operation of the mill, without being first desugared.

As thus obtained, the spent liquors generally have a solids content of from 40 to 55% by weight, usually 50%±2%; a viscosity of, for example, from 500 to 4000 centipoises at 25° C. and 50% concentration, and a pH of from 3.5 to 4.5.

If the solids content is less than about 40% by weight, the spent liquor contains too much water to be conveniently applicable to the manufacture of the adhesive products. If the liquor contains more than 55% solids, it is too viscous to handle conveniently in the plant.

The viscosity of the spent liquor preferably should be within a working viscosity range in which the liquor is pumpable at room temperature and readily mixable with the urea formaldehyde resin. Higher viscosities can be handled by warming the liquor. This permits the use of liquor having viscosities as high as 15,000 centipoises.

The liquor pH should be within the range of 3 to 9.

If the pH of the liquor is below 3, the adhesive in which it is contained cures too fast and gels too rapidly at room temperature for convenient handling. If the pH of the spent liquor is above about 9, the adhesive product of which it is a component cures too slowly to be practical.

The waste liquor preferably should be substantially free of dissolved sulfur dioxide (sulfite ion) since the presence of this material has the end result of raising the pH of the adhesive during hot pressing to a level at which the hot press cure it too slow, adversely affecting the production and properties of wood products made with the adhesive. The spent liquors, if not neutralized, become $SO_2$ free, because that material is driven off during the concentration of the liquor.

As discussed hereinabove, it is a unique quality of the herein described plywood glues that they will tolerate an extraordinarily large proportion of sulfite waste liquor solids, i.e. a proportion of from 10–70%, preferably 25–50% by weight of the combined dry weights of the resin and waste liquor solids. To be commercially significant, a waste liquor solids use of at least 10% is indicated. However, the experimental results presented herein in Example I and pictorally represented in the graphs of FIG. 1, indicate a maximum use of waste liquor solids of about 70%. Although adhesive performance drops during the upper end of this range, the adhesives still are satisfactory for use in interior hardwood paneling, crating materials and low grade furniture.

A key component of the adhesive product of the invention, and the one responsible for the successful combination of a large proportion of sulfite spent liquor with urea formaldehyde resin, is ammonium ion used in the amount of 0.2 to 4.0% by weight (expressed as $NH_3$) by weight on spent liquor solids. This component of the mixture has the above described function of reacting with a portion of the formaldehyde to form the relatively inactive product hexamethylene tetramine. This results in the reduction of the pH of adhesive mixture to a level at which it cures rapidly in the hot press.

If too much ammonium ion is present, the resultant high ammonia content of the adhesive reacts quickly with free or loosely combined formaldehyde in the urea formaldehyde resin to produce the stable hexamethylene tetramine, and releases large quantities of strong acids. These excessive quantities of acid in turn lower the pH of the mixture and catalyze the urea formaldehyde resin to a very rapid cure.

The effect of rapid-curing binder on plywood performance is to cause the loss of essential assembly time tolerance and a general lowering of bond strength properties through premature cure, loss of adhesive flow and dryout. Tolerance to warm veneer and mill operating conditions are also adversely affected. Finally, the pot life of the binder is severely reduced, introducing a serious risk of gelation in plant piping and equipment.

The ammonium ion component of the mixture is included as the water soluble ammonium salt of a strong mineral or organic acid (ionization constant Ka) of $10^{-3}$ or greater). Exemplary of such salts are:
Ammonium lignin sulfonate
Ammonium chloride
Ammonium sulfate
Mono-ammonium phosphate
Ammonium oxalate
Ammonium benzene sulfonate
Ammonium monochloracetic acetate It will be apparent that where the acid sulfite liquor comprises an ammonium base acid sulfite spent liquor, the ammonium salt is inherently contained in the spent liquor component of the adhesive product as ammonium lignin sulfonate. It is not necessary in this instance to add additional or extraneous ammonium salt.

In fact, since the ammonium ion content of the liquor usually exceeds that permitted in the hereindescribed adhesive products, the excess ammonium ion may be removed by treating with the predetermined amount of caustic soda or other strong base driving off ammonia and leaving only the desired content of ammonium ion as a residuum. However, the removal of excess ammonia with caustic should be done after the removal of sulfur dioxide (on the acid side) as set forth hereinabove.

If calcium, magnesium or sodium base spent liquors are employed, then a sufficient amount of ammonium salt is added to result in the formation of an adhesive product containing ammonium ion in the indicated proportion.

Another key component critically distinguishing the herein described plywood adhesives is the presence of a substantial amount of a filler or extender comprising an amylaceous plywood glue filler used in the amount of from 30 to 300 parts by weight per 100 parts of combined urea formaldehyde resin solids and sulfite waste liquor solids, dry solids basis. Particle board adhesives do not require the presence of an extender. However, plywood glues do require an extender both to space the wood veneer surfaces from each other, thus insuring the formation of an effective bond between them, and to retain waterborne adhesive solids as a film on the veneer surface and prevent their absorption into the veneer surface with a consequent loss of bonding efficiency.

As is well known, plywood glue fillers are of three general classes: amylaceous, cellulosic, and mineral fillers.

Examples of amylaceous fillers are the cereal grain flour fillers such as wheat flour, corn flour, barley flour, oat flour, rye flour, sorghum flour, and rice flour. Also included in this group are the root starches, such as potato, yam, and Cassava (tapioca).

Examples of cellulosic fillers are nut shell flours such as walnut shell flour, peach pit flour, wood flour, and powdered tree bark.

Examples of acceptable mineral fillers are powdered bentonite, feldspar, and attapulguite clays, and other acid-stable mineral powders.

Of the foregoing, only the amylaceous type fillers are suitable for the purposes of the invention on when used alone. If the cellulosic or mineral fillers only are employed, the wood surfaces of the plywood veneers quickly absorb the aqueous portion of freshly applied glue films, and leaving only the discrete particles of the filler between the wood veneer surfaces so that a glue bond is not formed upon pressing. On the other hand, the amylaceous flours lend themselves ideally to the present purposes. When applied to the veneer surfaces as an adhesive constituent, they hold the liquid glue, are gelatinized to a useful degree while retaining a particulate fraction and produce effective adhesive bonding of the veneers.

It is not necessary, however, to use a filler comprising 100% amylaceous material. A certain proportion of cellulosic and acid-stable mineral fillers, which per se are not operable, may be used in admixture with the amylaceous fillers.

Figure 2:
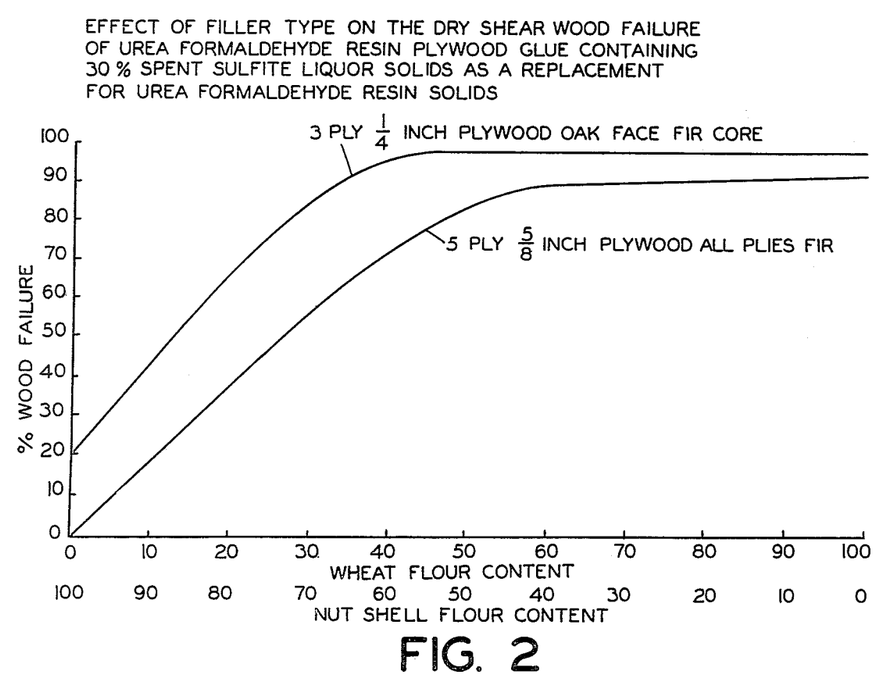
FIG. 2 is a graph illustrating the effect of filler identity and composition on the dry shear wood failure of urea formaldehyde plywood glues containing 30% sulfite liquor solids as a replacement for urea formaldehyde solids.

As is shown in FIG. 2 of the drawings, such fillers may be used in amounts of up to about 75% by weight of the total filler content while still retaining satisfactory glue properties.

However, if such a filler, e.g. walnut shell flour is used as the total filler content, the properties of the glues of which they are components are affected adversely to such an extent as to render them totally unsuited for use as plywood glues. It will be seen from FIG. 2 that in such a case the wood failure values of the three-ply samples tested was reduced to 20%, and of the 5-ply sample to 0%.

Desired amounts of desired additives may be included in the glue mix. Such additives may include for example suitable or conventional proportions of waxes, oils, fungicides, fire-proofing agents, surface active agents and dyes, in which case the lignin sulfonate salts of the sulfite waste liquor serve as dispersing agents for the waxes and the oils.

In formulating the plywood glues of the invention from the above primary components, these components in predetermined proportions are simply mixed in suitable and conventional mixing equipment until a uniform mixture is obtained. Preferably they are mixed in an intensive shear mixer until the mix is smooth.

The order of mixing is not of critical importance. However, in a typical sequence the liquid urea formaldehyde resin, or the spray-dried urea formaldehyde resin reconstituted by the addition of water, is placed in the mixer first. The filler then is added and then the two constituents mixed until smooth. Next the minor additives are added, followed by the liquid sulfite waste liquor and water added in amount sufficient to achieve the desired viscosity. The catalyst is added last.

The mixing is carried out at or near room temperature (10° to 30° C.) in order to inhibit condensation of the components of the sulfite spent liquor with the urea formaldehyde resin. As indicated above, the plywood glues of the invention are characterized by a very low degree of prior reaction between these components. The condensation of the adhesive takes place in the hot press during its cure.

The finished glue is stable for a reasonable length of time and may be stored and used in the plywood plant in conventional manner.

When it is used in the manufacture of plywood, it is applied to the surfaces of the veneers by roll coating, spray coating, curtain coating or other suitable manner. Spreads of the order of 75–85 pounds of glue per thousand square feet of double glue line are employed. The veneers are laid up in the usual way and pressed in conventional plywood presses using appropriate pressing conditions, as indicated in the Examples hereinbelow.

Suitable press conditions are as follows:
Glue spread, all panels—60–90 #/MDGL
Assembly time, all panels—2 to 120 minutes
Hot press time, 3 ply ¼"—2 to 3½ minutes at 260° F.
Hot press time, 5 ply ⅜"—4 ½ to 6 minutes
Press temperature—230 to 290° F.
Platen pressure—125 to 225 psi.

As also is shown in the following examples, the resulting plywood products have properties which are commercially acceptable and fully competitive with the properties of plywood made with conventional urea formaldehyde resin adhesives. The plywood glues of the invention have the additional significant and economic advantage of including a large proportion of low cost sulfite waste liquor, which results in significant glue cost savings to the mill in which they are employed.

EXAMPLES

The plywood glues of the invention and the manner of their formulation and use are illustrated in the following examples, wherein the following abbreviations are used:

WSL—waste sulfite liquor (spent sulfite liquor)
UF—urea formaldehyde
/MDGL—pounds per thousand square feet of double glue line
"Urea resin"—Urea formaldehyde resin
"High solids"—a glue mix containing 26 to 32% by weight UF resin solids
"Intermediate solids"—A glue mix containing 20–26% by weight UF resin
"Low solids"—a glue mix containing 14 to 20% by weight UF resin solids
Parts—parts by weight, dry solids basis The plywood products incorporating my herein described glues, and the control plywood products were tested according to the U.S. Department of Commerce National Bureau of Standards Voluntary Product Standard PS - 51-71, the standard employed for testing hardwood and decorative plywood. The specific tests employed were the 2 cycle soak test (Sections 4.2.3 and 4.6) and the dry shear wood failure test (Section 4.3) set forth in this standard. The dry shear test results for all panels within claimed limits passed the PS 51-71 requirements for Type 1 Plywood dry shear adhesion, with the wood failure being reported as follows:

| WOOD FAILURE REQUIREMENTS FOR TECHNICAL TYPE 1 PLYWOOD GLUE BONDS | | |
|---|---|---|
| | Minimum wood failure | |
| Average failing load | Indiv. Specimen | Test piece average |
| lb/sq.in. | Percent* | Percent* |
| Under 250 | 25 | 50 |
| 250–350 | 10 | 30 |
| Above 350 | 10 | 15 |

*These values are the percentage of wood area remaining adhered to the fractured surface in the test area.

The 2-cycle soak test results for all panels within claimed limits passed the PS 51-71 requirements for Type III plywood water resistance. The requirements are as follows:

3.9.4 Type III Plywood -

"The glue bond of Type III plywood shall be of such a quality that specimens shall withstand the Z-cycle soak test described in 4.2 and 4.6".

In all of the following examples the plywood adhesives were formulated, applied to wood veneers, and wood veneers laid up and pressed into plywood by the general procedures set forth above. Unless otherwise noted, the specific plywood manufacturing conditions were as follows:

Panel construction, softwood—5 plies of ⅛"—Douglas Fir
Panel construction, hardwood—5/16" 3-ply, 1/10—oak face and ⅛"—Douglas fir core
Glue spread, all panels—75–80 #MDGL
Assembly time, all panels—20 minutes
Hot press time, 5-ply—5 ¼ minutes
Hot press time, 3-ply—3 minutes
Press Temperature—280° F.
Platen Pressure—175 psi.

EXAMPLE 1

High Solids Urea Resin Plywood Glue at 15, 30, and 60% Substitution of Ammonia Base WSL for Liquid UF Resin

| Components | Control 0% WSL | WSL Substitution Level* | | |
|---|---|---|---|---|
| | | 15% WSL | 30% WSL | 60% WSL |
| UF Resin, liquid | 100 | 100 | 100 | 100 |
| Wheat Flour | 30 | 25 | 30 | 30 |
| Nut Shell Flour | 30 | 30 | 30 | 30 |
| Water | 55 | 55 | 55 | 55 |
| Ammonium Sulfate | 2 | 2 | 2 | 2 |
| WSL, liquid, Ammonia base | — | 21 | 52 | 180 |
| Mixed Glue Properties | Control | 15% | 30% | 60% |
| UF Resin Solids | 29.1% | 27% | 23.3% | 15.9% |
| Viscosity at 25° C. | 5850 cps | 3200 cps | 2800 cps | 2500 cps |
| pH | 4.5 | 4.9 | 5.14 | 5.45 |
| Overnight 25° C. Cure | hard | hard | hard | hard |
| Adhesive Performance | Control | 15% | 30% | 60% |
| Softwood dry shear | 307–96** | 290–95 | 259–85 | 222–68 |
| Hardwood dry shear | 196–99 | 364–74 | 287–97 | 215–75 |
| Softwood 2-cycle soak | Pass | Pass | Pass | Pass |
| Hardwood 2-cycle soak | Pass | Pass | Pass | Pass |

*Based on combined UF resin-WSL solids basis
**Psi breaking load - percent wood failure Other Conditions:
Urea Resin Mol Ratio—1:1.9
Urea Resin Witte Number—1.43
Urea Resin Solids—62.5%
Urea Resin Viscosity—780 cps at 25° C.
Urea Resin pH—7.8
Sulfite Spent Liquor Solids—50%
Sulfite Spent Liquor Viscosity—800 cps at 25° C.
Sulfite Spent Liquor pH—6.1
Sulfite Spent Liquor Ammonia Content *—0.21%
* Caustic treated to low ammonia content

EXAMPLE II

High solids urea resin plywood glue with a 45% substitution of Ammonia-base WSL solids for UF resin solids and containing mixed wheat flours as the particulate extender

| Component | Composition |
|---|---|
| Urea resin, liquid | 100 |
| Wheat Flour, Hard | 45 |
| Wheat Flour, Soft | 15 |
| Water | 50 |
| WSL | 99 |
| Ammonium Sulfate | 2 |
| Mixed Glue Properties | |
| UF Resin Solids | 21% |
| Viscosity at 25° C. | 2850 cps |
| pH | 4.35 |
| Overnight 25° C. Cure | Hard |
| Adhesive Performance | |
| Softwood Dry Shear | 82-89 |
| Hardwood Dry Shear | 197-92 |
| Softwood 2-cycle Soak | Pass |
| Hardwood 2-cycle Soak | Pass |

Other Conditions
  UF Resin Mol Ratio—1:1.90
  UF Resin Witte No.—1.43
  UF Resin Solids—65%
  UF Resin Viscosity—1050 cps at 25° C.
  UF Resin pH— 7.15
  Spent Sulfite Liquor Base—Ammonia
  Spent Sulfite Liquor Solids—50%
  Spent Sulfite Liquor Viscosity—1850 cps
  Spent Sulfite Liquor pH—3.60
  Spent Sulfite Liquor Ammonia Content—4%

Figure 1:
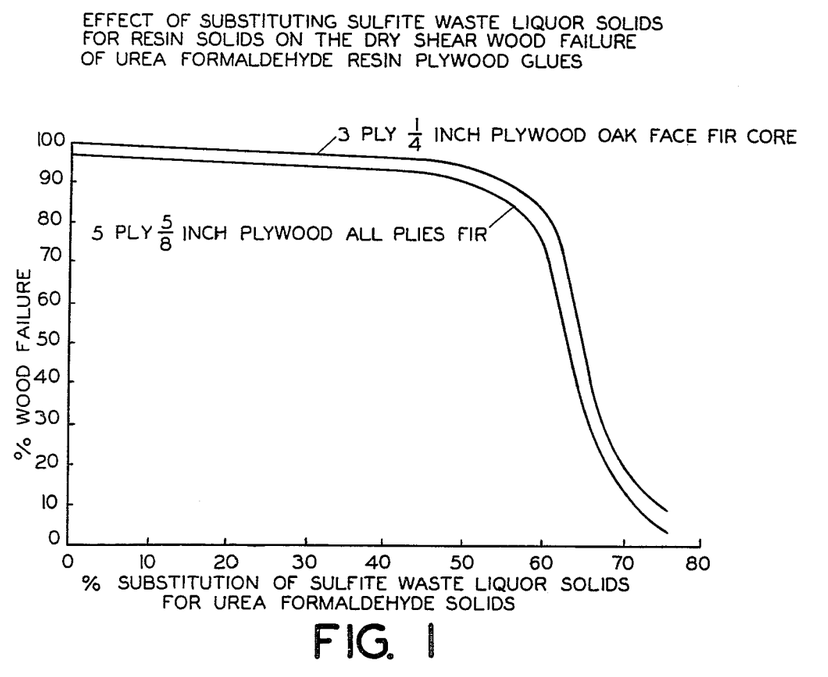
FIG. 1 is a graph illustrating the effect of substituting spent sulfite liquor solids for urea formaldehyde resin solids on the dry shear wood failure properties of urea formaldehyde resin plywood glues.

The data of Examples I and II were used in the construction of the graph of FIG. 1 of the drawings.

EXAMPLE III

Intermediate solids urea resin plywood glue at 33% level of substitution of WSL for UF resin solids

| Component | Control | 33% |
|---|---|---|
| UF Resin | 100 | 100 |
| Wheat Flour | 75 | 75 |
| Nut Shell Flour | 15 | 15 |
| Water | 92 | 92 |
| WSL, Ammonium base | — | 42 |
| Ammonium Sulfate | 2 | 2 |
| Mixed Glue Properties | Control | 33% |
| UF Resin Solids | 22.1% | 19.3% |
| Viscosity at 25° C. | 4800 cps | 4500 |
| pH | 4.89 | 5.15 |
| Overnight 25° C. cure | Hard | Hard |
| Adhesive Performance | Control | 33% |
| Softwood dry shear | 100* | 100 |
| Hardwood dry shear | 100 | 100 |
| Softwood 2-cycle soak | Pass | Pass |
| Hardwood 2-cycle soak | Pass | Pass |

*shear wood failure

Other Conditions:
  UF Resin Mol Ratio—1:1.9
  UF Resin Witte No.—1.43
  UF Resin Solids—63%
  UF Resin Viscosity—750 cps at 25° C.
  UF Resin pH—7.6
  Sulfite Spent Liquor Solids—52%
  Sulfite Spent Liquor Viscosity—800 cps at 25° C.
  Sulfite Spent Liquor pH—6.0
  Sulfite Spent Liquor Ammonia Content*—0.2%
*Caustic treated to low ammonia content

EXAMPLE IV

High solids urea resin plywood glue at 40% substitution of WSL for UF resin solids using high ammonia content in the WSL as the only acid catalyst

| Component | 40% WSL |
|---|---|
| UF Resin | 100 |
| Wheat Flour | 36 |
| Nut Shell Flour | 36 |
| Water | 88 |
| WSL - 50% Solids Ammonia base | 86 |
| Mixed Glue Properties | |
| UF Resin Solids | 18.1% |
| Viscosity at 25° C. | 1800 |
| pH | 4.25 |
| Overnight 25° C. Cure | Hard |
| Adhesive Performance | |
| Softwood dry shear | 187-63%* |
| Hardwood dry shear | 254-81% |
| Softwood 2-cycle soak | Pass |
| Hardwood 2-cycle soak | Pass |

*psi breaking load - percent wood failure

Other Conditions:
  UF Resin Mol Ratio—1:1.9
  UF Resin Witte No.—1.43
  UF Resin Solids—63%
  UF Resin Viscosity—750 cps at 25° C.
  UF Resin pH—7.6
  Sulfite Spent Liquor Solids—50%
  Sulfite Spent Liquor Viscosity—800 cps at 25° C.
  Sulfite Spent Liquor pH—4.0
  Sulfite Spent Liquor Ammonia Content—4.5%

EXAMPLE V

High solids urea resin plywood glue at 26% substitution of WSL for UF resin solids using an acceptably low mol ratio urea resin (1:1.35).

| Component | Control | 20% WSL |
|---|---|---|
| UF resin | 100 | 100 |
| Wheat Flour | 30 | 30 |
| Nut Shell Flour | 30 | 30 |
| Water | 60 | 60 |
| WSL ammonia base | — | 42 |
| Ammonium Sulfate | 2 | 2 |
| Mixed Glue Properties | Control | 20% WSL |
| UF Resin Solids | 28.4% | 23.9% |
| Viscosity at 25° C. | 5000 cps | 2850 cps |
| pH | 5.4 | 5.69 |
| Overnight 25° C. Cure | Hard | Hard |
| Adhesive Performance | | |
| Softwood Dry Shear | 99 | 91 |
| Hardwood Dry Shear | 100 | 90 |
| Softwood 2-cycle soak | Pass | Pass |
| Hardwood 2-cycle soak | Pass | Pass |

Other Conditions:
  Urea Resin Mol Ratio—1:1.35
  Urea Resin Witte No.—1.14
  Urea Resin Solids—65.5%
  Urea Resin Viscosity—350 cps at 25° C.
  Urea Resin pH—7.5
  Sulfite Spent Liquor Solids—50%
  Sulfite Spent Liquor Viscosity—800 cps at 25° C.
  Sulfite Spent Liquor pH—6.0
  Sulfite Spent Liquor Ammonia Content*—0.22%

EXAMPLE VI

High solids urea resin plywood glue at 30% substitution of WSL for UF resin solids using a marginally low mol ratio urea resin (1:1.20).

| Component | 30% WSL |
|---|---|
| UF Resin | 100 |
| Wheat Flour | 30 |
| Nut Shell Flour | 30 |
| Water | 55 |
| WSL, ammonia base | 54 |
| Ammonium Sulfate | 2 |
| Mixed Glue Properties | |
| UF Resin Solids | 24.2% |
| Viscosity at 25° C. | 2300 cps |
| pH | 6.3 |
| Overnight 25° C. Cure | very viscous liquid |
| Adhesive Performance | |
| Softwood Dry Shear | 232-21 |
| Hardwood Dry Shear | 264-63 |
| Softwood 2-cycle soak | Pass |
| Hardwood 2-cycle soak | Pass |

Other Conditions:
  Urea Resin Mol Ratio—1:1.20
  Urea Resin Witte No.—1.07
  Urea Resin Solids—65%
  Urea Resin Viscosity—330 cps at 25° C.
  Urea Resin pH—7.6
  Sulfite Spent Liquor Solids—52%
  Sulfite Spent Liquor Viscosity—1400 cps at 25° C.
  Sulfite Spent Liquor pH—6.1
  Sulfite Spent Liquor Ammonia Content*—0.21%
*Caustic treated to low ammonia content

EXAMPLE VII

High solids urea resin plywood glue at 30% substitution of WSL for UF resin solids using an unacceptably low mol ratio urea resin (1:1.10)

| Component | Control | 30% WSL |
|---|---|---|
| UF Resin | 100 | 100 |
| Wheat Flour | 30 | 30 |
| Nut Shell Flour | 30 | 30 |
| Water | 75 | 50 |
| WSL | — | 54 |
| Ammonium Sulfate | 2 | 2 |
| Mixed Glue Properties | | |
| UF Resin Solids | 27.4% | 23.9% |
| Viscosity at 25° C. | 1850 cps | 2020 cps |
| pH | 6.18 | 6.0 |
| Overnight 25° C. Cure | liquid-2600 cps | liquid-4750 cps |
| Adhesive Performance | | |
| Softwood Dry shear | 131-13 | 85-6 (blow) |
| Hardwood dry shear | 192-18 | 163-10 |
| Softwood 2-cycle soak | Fail | Fail |
| Hardwood 2-cycle soak | Fail | Fail |

Other Conditions:
  Urea Resin Mol Ratio—1:1.10
  Urea Resin Witte No.—1.02
  Urea Resin Solids—66%
  Urea Resin Viscosity—340 cps at 25° C.
  Urea Resin pH—7.6
  Sulfite Spent Liquor Base—Sodium
  Sulfite Spent Liquor Solids—50%
  Sulfite Spent Liquor Viscosity—460 cps at 25° C.
  Sulfite Spent Liquor pH—5.8
  Sulfite Spent Liquor Ammonia Content—Zero

EXAMPLE VIII

High solids urea resin plywood glue with a 30% substitution of sodium-base spent sulfite liquor solids for UF resin solids.

| Component | 30% WSL |
|---|---|
| UF Resin, liquid | 100 |
| Wheat Flour | 30 |
| Nut Shell Flour | 30 |
| Water | 55 |
| WSL | 55 |
| Ammonium Sulfate | 2 |
| Mixed Glue Properties | |
| UF Resin solids | 23% |
| Viscosity at 25° C. | 2150 cps |
| pH | 5.35 |
| Overnight 25° C. Cure | Hard |
| Adhesive Performance | |
| Softwood Dry Shear | 107-75 |
| Hardwood Dry Shear | 157-89 |
| All-oak Dry Shear | 313-85 |
| Softwood 2-cycle soak | Pass |
| Hardwood 2-cycle soak | Pass |
| All-oak 2-cycle soak | Pass |

Other Conditions:
  UF Resin Mol Ratio—1:1.90
  UF Resin Witte No.—1.43
  UF Resin solids—62.7%
  UF Resin viscosity—900 cps. at 25° C.
  UF Resin pH—7.5
  Spent Sulfite Liquor Base—Sodium
  Spent Sulfite Liquor Solids—50%
  Spent Sulfite Liquor Viscosity—375 cps. at 25° C.
  Spent Sulfite Liquor pH—5.8
  Spent Sulfite Liquor Ammonia Content—Zero
  Panel Construction, softwood—⅝" 5-ply, 5 plies of ⅛" Douglas Fir
  Panel Construction, hardwood—5/16" 3-ply, 1/10" Oak faces and ⅛" Douglas Fir core
  Panel Construction, all-oak—½" 3-ply, 3 plies of 1/6" Red Oak
  Glue Spreads, all panels—80-85#/MDGL
  Assembly time, all panels—20 minutes
  Hot press time, ⅝" 5-ply—5¼ minutes
  Hot press time, ½" 3-ply—4½ minutes
  Hot press time, 5/16" 3-ply—3 minutes
  Platen temperature—280° F.
  Platen pressure—175 psi
  Platen pressure—200 psi (all-oak)

EXAMPLE IX

High solids urea resin plywood glue made with 30% Ammonia-base WSL solids and 70% spraydried UF resin solids

| Component | 30% WSL |
|---|---|
| Spraydried UF Resin | 66 |
| Water | 100 |
| WSL | 56 |
| Wheat Flour | 30 |
| Nut shell flour | 30 |
| Ammonium Sulfate | — |
| Mixed Glue Properties | |
| UF Resin Solids | 23.4% |

-continued

| | |
|---|---|
| Viscosity at 25° C. | 2900 cps |
| pH | 4.1 |
| Overnight 25° C. Cure | Hard |

| Adhesive Performance | |
|---|---|
| Softwood Dry shear | 110–65 |
| Hardwood Dry shear | 216–76 |
| Softwood 2-cycle soak | Pass |
| Hardwood 2-cycle soak | Pass |

Other Conditions:
  Urea resin mol ratio—1:1.80
  Urea resin Witte No.—1.38
  Urea resin solids—100%
  Urea resin viscosity—solid
  Urea resin pH—7.0
  Sulfite spent liquor base—Ammonia
  Sulfite spent liquor solids—50%
  Sulfite spent liquor viscosity—800 cps
  Sulfite spent liquor pH—4.0
  Sulfite spent liquor ammonia content—4.5%

EXAMPLE X

High solids urea resin plywood glue with a 30% substitution of Calcium-base spent sulfite liquor solids for UF resin solids.

| Component | 30% WSL |
|---|---|
| UF Resin | 100 |
| Wheat Flour | 30 |
| Nut Shell Flour | 30 |
| Water | 55 |
| WSL | 55 |
| Ammonium Sulfate | 2 |

| Mixed Glue Properties | |
|---|---|
| UF Resin Solids | 24% |
| Viscosity at 25° C. | 3600 cps |
| pH | 6.25 |
| Overnight 25° C. Cure | Hard |

| Adhesive Performance | |
|---|---|
| Softwood Dry Shear | 125–82 |
| Hardwood Dry Shear | 217–97 |
| Softwood 2-cycle soak | Pass |
| Hardwood 2-cycle soak | Pass |

Other Conditions:
  UF Resin Mol Ratio—1:1.90
  UF Resin Witte No.—1.43
  UF Resin Solids—62.7
  UF Resin Resin Viscosity—830 cps at 25° C.
  UF Resin pH—7.6
  Spent Sulfite Liquor Base—Calcium
  Spent Sulfite Liquor Solids—50%
  Spent Sulfite Liquor Viscosity—170 cps at 25° C.
  Spent Sulfite Liquor pH—4.4
  Spent Sulfite Liquor Ammonia Content—Zero
  Glue spread, all panels—75–80 #/MDGL

EXAMPLE XI

High solids urea resin plywood glue with a 32% substitution of Magnesium-base spent sulfite liquor solids for UF resin solids

| Component | 32% WSL |
|---|---|
| UF Resin, liquid | 100 |
| Wheat Flour | 30 |
| Nut shell flour | 30 |
| Water | 55 |
| WSL | 55 |
| Ammonium sulfate | 2 |

| Mixed Glue Properties | |
|---|---|
| UF Resin solids | 23% |
| Viscosity at 25° C. | 2850 cps |
| pH | 5.0 |
| Overnight 25° C. cure | Hard |

| Adhesive Performance | |
|---|---|
| Softwood Dry Shear | 146–96 |
| Hardwood Dry Shear | 152–99 |
| All-oak Dry Shear | 304–87 |
| Softwood 2-cycle soak | Pass |
| Hardwood 2-cycle soak | Pass |
| All-oak 2-cycle soak | Pass |

Other Conditions:
  UF Resin mol ratio—1:1.90
  UF Resin Witte No.—1.43
  UF Resin solids—62.7%
  UF Resin viscosity—890 cps at 25° C.
  UF Resin pH—7.5
  Spent Sulfite Liquor Base—Magnesium
  Spent Sulfite Liquor solids—55.7%
  Spent Sulfite Liquor viscosity—3230 cps at 25° C.
  Spent Sulfite Liquor pH—4.9
  Spent Sulfite Liquor Ammonia content—Zero
  Panel Construction, softwood—$\frac{5}{8}''$ 5-ply, 5 plies of $\frac{1}{8}''$ Douglas Fir
  Panel Construction, hardwood—5/16″ 3-ply, 1/10″ Oak faces and 1/8″ Douglas fir core
  Panel Construction, all-oak—$\frac{1}{2}''$ 3-ply, 3 plies of 1/6″ Red Oak
  Glue Spread, all panels—80–85#/MDGL
  Assembly time, all panels—20 minutes
  Hot press time, $\frac{5}{8}''$ 5-ply—$5\frac{1}{4}$ minutes
  Hot press time $\frac{1}{2}''$ 3-ply—$4\frac{1}{2}$ minutes
  Hot press time 5/16″ 3-ply—3 minutes
  Platen temperature—280° F.
  Platen pressure—175 psi
  Platen pressure—200 psi (all oak)

EXAMPLE XII

High solids urea resin plywood glue with a 30% substitution of Ammonia-base spent sulfite liquor solids for UF resin solids and containing normal levels of particulate filler (wheat flour and walnut shell flour used about half and half) used at assembly times of 1, 3, 5 and 20 minutes.

| Component | Parts |
|---|---|
| UF Resin, liquid | 100 |
| Wheat Flour | 30 |
| Nut Shell Flour | 30 |
| Water | 61 |
| WSL | 55 |
| Ammonium Sulfate | 2 |

| Mixed Glue Properties | |
|---|---|
| UF Resin Solids | 23% |
| Viscosity at 25° C. | 2100 cps |
| pH | 5.16 |
| Overnight 25° C. Cure | Hard |

| Adhesive Performance | | |
|---|---|---|
| Softwood Panels: | Dry Shear | 2-cycle Soak |
| 1 minute assembly time | 225–62 | Pass |
| 3 minute assembly time | 268–55 | " |
| 5 minute assembly time | 218–83 | " |

| | | |
|---|---|---|
| 20 minute assembly time | 209-81 | " |
| Hardwood Panels: | | |
| 1 minute assembly time | 190-46 | " |
| 3 minute assembly time | 237-84 | " |
| 5 minute assembly time | 296-84 | " |
| 20 minute assembly time | 253-86 | " |

EXAMPLE XIII

Intermediate solids urea resin plywood glue with a 30% substitution of Ammonia-base spent sulfite liquor solids for UF resin solids and containing only wheat flour as the particulate extender used at assembly times of 1, 3, 5 and 20 minutes.

| Component | Parts |
|---|---|
| UF Resin, liquid | 100 |
| Wheat Flour | 100 |
| Water | 130 |
| WSL | 55 |
| Ammonium sulfate | 2 |
| Mixed Glue Properties | |
| UF Resin Solids | 16.8% |
| Viscosity at 25° C. | 2950 cps |
| pH | 5.64 |
| Overnight 25° C. Cure | Hard |

Adhesive Performance

| Softwood Panels: | Dry Shear | 2-cycle soak |
|---|---|---|
| 1 minute assembly time | 295-80 | Pass |
| 3 minute assembly time | 273-79 | " |
| 5 minute assembly time | 224-98 | " |
| 20 minute assembly time | 238-94 | " |
| Hardwood Panels: | | |
| 1 minute assembly time | 211-74 | " |
| 3 minute assembly time | 175-40 | " |
| 5 minute assembly time | 234-99 | " |
| 20 minute assembly time | 269-99 | " |

EXAMPLE XIV

High solids urea resin plywood glue with a 30% substitution of Ammonia-base spent sulfite liquor solids for UF resin solids and containing no particulate extender used at assembly times of 1, 3, 5 and 20 minutes.

| Component | Parts |
|---|---|
| UF Resin, liquid | 100 |
| WSL | 50 |
| Ammonium Sulfate | 2 |
| Mixed Glue Properties | |
| UF Resin Solids | 41% |
| Viscosity at 25° C. | 1750 cps |
| pH | 5.10 |
| Overnight 25° C. Cure | Hard |

Adhesive Performance

| Softwood Panels: | Dry Shear | 2-cycle Soak |
|---|---|---|
| 1 minute assembly time | 277-57 | Pass |
| 3 minute assembly time | 233-75 | " |
| 5 minute assembly time | 215-72 | " |
| 20 minute assembly time | 192-85 | " |
| Hardwood Panels: | | |
| 1 minute assembly time | 182-13 | Fail |
| 3 minute assembly time | 164-58 | Pass |
| 5 minute assembly time | 187-29 | " |
| 20 minute assembly time | 284-89 | " |

EXAMPLE XV

Intermediate solids urea resin plywood glue containing 50% Ammonia-base spent sulfite liquor as the only diluent of UF resin solids, used at assembly times of 1, 3, 5 and 20 minutes (all liquid system).

| Component | Parts |
|---|---|
| UF Resin, liquid | 100 |
| WSL | 150 |
| Mixed Glue Properties | |
| UF Resin Solids | 25.2% |
| Viscosity at 25° C. | 1060 cps |
| pH | 5.3 |
| Overnight 25° C. Cure | Hard |

Adhesive Performance

| Softwood Panels: | Dry Shear | 2-cycle Soak |
|---|---|---|
| 1 minute assembly time | Blow | Fail |
| 3 minute assembly time | " | " |
| 5 minute assembly time | " | " |
| 20 minute assembly time | " | " |
| Hardwood Panels: | | |
| 1 minute assembly time | 185-01 | Fail |
| 3 minute assembly time | 166-09 | " |
| 5 minute assembly time | 193-03 | " |
| 20 minute assembly time | 79-02 | " |

EXAMPLES 12 THROUGH 15

Other Conditions: *
 UF Resin Mol Ratio—1:1.90
 UF Resin Witte No.—1.43
 UF Resin Solids—63.1%
 UF Resin Viscosity—895 cps
 UF Resin pH—7.5
 Spent Sulfite Liquor Base—Ammonia
 Spent Sulfite Liquor Solids—50%
 Spent Sulfite Liquor Viscosity—995 cps
 Spent Sulfite Liquor pH—5.85
 Spent Sulfite Liquor Ammonia Content **—0.25%

*These material properties and layup conditions apply equally to the glue mixes and plywood bonding experiments in Examples 12, 13, 14, and 15.
**Caustic treated to low ammonia content Glue spread, all panels—75-80 #/MDGL
Assembly times—1, 3, 5 and 20 minutes, as shown The data of Examples XII-XV demonstrate that a particulate filler or extender is a critical ingredient of the herein described urea-formaldehyde resin, waste liquor-ammonia composition in order to make it perform satisfactorily as a plywood glue.

Example XII is a control example in which there is a 30% substitution of spent sulfite liquor solids for urea formaldehyde resin solids.

Example XIII is similar except that the particulate extender is all wheat flour instead of half wheat flour and half nut shell flour. Adhesive performance is satisfactory down to the shortest possible assembly time of one minute. This shows that the particulate filler may consist entirely of cereal grain flour.

Example XIV illustrates the adhesive performance of an adhesive at very high urea resin solids containing only spent sulfite liquor as a diluent, plus ammonium sulfate as the acid catalyst. There is no particulate filler at all. In spite of the uneconomically high level of urea formaldehyde resins solids (41% vs. about 25%) performance is marginal and starting to drop below useful levels.

Example XV illustrates the adhesive performance of a glue at 25% urea formaldehyde solids containing only spent sulfite liquor as a diluent and extender. There is no particulate filler.

The performance of this glue is totally unsatisfactory.

Comparing the adhesive performance of the glue mix in Example XV with those of the 45% waste sulfite liquor substitution in Example II and the 60% waste sulfite liquor substitution in Example I, it is noted that the latter provide commercially acceptable plywood even though they contain a good deal less urea formaldehyde resin solids and equally large amounts of waste liquor. This demonstrates the importance of using a particulate cereal filler in the glue composition of my invention.

EXAMPLE XVI

Intermediate solids urea resin plywood glues at 67% and 75% levels of substitution of WSL for UF resin solids

| Component | Composition | |
|---|---|---|
| | 67% WSL | 75% WSL |
| UF Resin, liquid | 100 | 100 |
| Wheat Flour | 90 | 100 |
| Nut Shell Flour | — | 15 |
| Water | 60 | 90 |
| WSL | 260 | 375 |
| Ammonium Sulfate | 2 | 2 |
| Mixed Glue Properties | | |
| UF Resin Solids | 12.7% | 9.6% |
| Viscosity at 25° C. | 3050 cps | 3200 cps |
| pH | 5.62 | 5.50 |
| Overnight 25° C. Cure | Hard | Hard |
| Adhesive Performance | | |
| Softwood dry shear | 169-30 | 159-09 |
| Hardwood dry shear | 125-24 | 99-04 |
| Softwood 2-cycle soak | Fail | Fail - 1st cycle |
| Hardwood 2-cycle soak | Fail | Fail - 1st cycle |

EXAMPLE XVII

Intermediate solids urea resin plywood glue with a 25% substitution of WSL solids for UF resin solids and containing a mixture of wheat flour and clay as the particulate extender

| Component | Composition |
|---|---|
| Urea Resin, liquid | 100 |
| Wheat Flour | 30 |
| Clay | 60 |
| Water | 50 |
| WSL | 42 |
| Ammonium Sulfate | 2 |
| Mixed Glue Properties | |
| UF Resin Solids | 23% |
| Viscosity at 25° C. | 3100 cps |
| pH | 5.13 |
| Overnight 25° C. Cure | Hard |
| Adhesive Performance | |
| Softwood Dry Shear | 246-89 |
| Hardwood Dry Shear | 236-76 |
| Softwood 2-cycle Soak | Pass |
| Hardwood 2-cycle Soak | Pass |

EXAMPLE XVIII

Intermediate solids urea resin plywood glue with a 25% substitution of WSL solids for UF resin solids and containing a mixture of wheat flour and wood flour as the particulate extender

| Component | Composition |
|---|---|
| Urea Resin, liquid | 100 |
| Wheat Flour | 30 |
| Wood Flour | 60 |
| Water | 170 |
| WSL | 42 |
| Ammonium Sulfate | 2 |
| Mixed Glue Properties | |
| UF Resin Solids | 16.2% |
| Viscosity at 25° C. | 3200 cps |
| pH | 5.44 |
| Overnight 25° C. Cure | Hard |
| Adhesive Performance | |
| Softwood Dry Shear | 266-28 |
| Hardwood Dry Shear | 161-27 |
| Softwood 2-cycle Soak | Fail |
| Hardwood 2-cycle Soak | Pass |

EXAMPLE XIX

Intermediate solids urea resin plywood glues with a 25% substitution of WSL solids for UF resin solids and containing 72 and 81 percent of the total particulate extender as nut shell flour

| Component | Composition | |
|---|---|---|
| | 72% Nut Shell Flour | 81% Nut Shell Flour |
| Urea Resin, liquid | 100 | 100 |
| Wheat Flour | 25 | 18 |
| Nut Shell Flour | 65 | 78 |
| Water | 110 | 122 |
| WSL | 42 | 42 |
| Ammonium Sulfate | 2 | 2 |
| Mixed Glue Properties | | |
| UF Resin Solids | 19.0% | 18.1% |
| Viscosity at 25° C. | 4400 cps | 3950 cps |
| pH | 5.26 | 5.05 |
| Overnight 25° C. Cure | Hard | Hard |
| Adhesive Performance | | |
| Softwood Dry Shear | 259-51 | 237-42 |
| Hardwood Dry Shear | 246-74 | 143-71 |
| Softwood 2-cycle Soak | pass | pass |
| Hardwood 2-cycle Soak | pass | pass |

EXAMPLE XX

High solids urea resin plywood glue with a 30% substitution of WSL solids for UF resin solids and containing only nut shell flour as the particulate extender used at assembly times of 5 to 20 minutes

| Component | Parts |
|---|---|
| UF Resin, liquid | 100 |
| Nut shell flour | 60 |
| Water | 53 |
| WSL | 55 |
| Ammonium Sulfate | 2 |
| Mixed Glue Properties | |
| UF Resin Solids | 24.3% |
| Viscosity at 25° C. | 2600 cps |
| pH | 5.02 |
| Overnight 25° C. Cure | Hard |
| Adhesive Performance | |

| Softwood Panels: | Dry Shear | 2-cycle Soak |
|---|---|---|
| 5 minute assembly time | Blow | Fail |
| 20 minute assembly time | Blow | Fail |
| Hardwood Panels: | | |
| 5 minute assembly time | 159–7 | Fail |
| 20 minute assembly time | 129–35 | Pass |

EXAMPLES 16 THROUGH 20

Other Conditions:
  UF Resin Mol Ratio—1:1.90
  UF Resin Witte No.—1.43
  UF Resin Solids—65%
  UF Resin Viscosity—870 cps
  UF Resin pH—7.6
  Spent Sulfite Liquor Base—Ammonia
  Spent Sulfite Liquor Solids—50%
  Spent Sulfite Liquor Viscosity—995 cps at 25° C.
  Spent Sulfite Liquor pH—5.9
  Spent Sulfite Liquor Ammonia Content*—0.25%
  Glue spread, all panels—75–80 #/MDGL

* Caustic treated to low ammonia content

Having thus described my invention in preferred embodiments, I claim:

1. A plywood glue comprising in aqueous admixture with each other and in parts by weight, dry solids basis:
Urea-Formaldehyde Resin—30–90
Spent Liquor from the Acid Sulfite Pulping of Lignocellulose—10–70
   the glue including also a filler comprising an amylaceous plywood glue filler used in the amount of from 30 to 300 parts for each 100 parts of the mixture of resin and spent liquor,
   the glue containing from 0.2 to 4.0% by weight ammonium ion (expressed as NH$_3$) on a spent liquor solids basis,
   the spent liquor component of the mixture prior to mixing having a pH of from 3–9,
   the urea formaldehyde resin component of the mixture prior to mixing being characterized by a mol ratio of formaldehyde to urea of from 1.2 to 2.5; a pH of from 6 to 9; and a methylol content corresponding to a Witte number of from 1.0 to 2.2.

2. The plywood glue of claim 1 wherein the urea formaldehyde resin is used in an amount of from 50–75 parts, the spent liquor in an amount of from 25–50 parts, and the filler in an amount of from 75–150 parts.

3. The plywood glue of claim 1 wherein the amylaceous filler comprises a cereal flour type plywood glue filler and not more than 75% by weight, based on the total weight of the filler, of a non-amylaceous plywood glue filler.

4. The plywood glue of claim 1 wherein the amylaceous filler comprises a cereal type plywood glue flour filler.

5. The plywood glue of claim 1 wherein the amylaceous filler comprises a wheat flour filler.

6. The plywood glue of claim 1 wherein the amylaceous filler comprises a sorghum flour filler.

7. The plywood glue of claim 1 wherein the amylaceous filler comprises a root starch type plywood glue filler.

8. The plywood glue of claim 1 wherein the amylaceous filler comprises a potato starch filler.

9. The plywood glue of claim 1 wherein the amylaceous filler comprises a tapioca starch filler.

10. The method of making plywood which comprises applying to the surfaces of wood veneers a bonding quantity of an aqueous plywood glue comprising in admixture with each other and in parts by weight, dry solids basis:
Urea-Formaldehyde Resin—30–90
Spent Liquor from the Acid Sulfite Pulping of Lignocellulose—10–70
   the glue including also a filler comprising an amylaceous plywood glue filler used in the amount of from 30 to 300 parts for each 100 parts of the mixture of resin and spent liquor,
   the glue containing from 0.2 to 4.0% by weight ammonium ion (expressed as NH$_3$) on a spent liquor solids basis.
   the spent liquor component of the mixture prior to mixing having a pH of from 3–9,
   the urea formaldehyde resin component of the mixture prior to mixing being characterized by a mol ratio of formaldehyde to urea of from 1.2 to 2.5; a pH of from 6 to 9; and a methylol content corresponding to a Witte number of from 1.0 to 2.2,
   assembling the resulting glue-coated wood veneers and pressing the veneers to form the finished plywood product.

11. The plywood product produced by the method of claim 10.

* * * * *